United States Patent

[11] 3,548,901

[72] Inventor Harold E. Schaller
 East Aurora, N.Y.
[21] Appl. No. 651,922
[22] Filed July 7, 1967
[45] Patented Dec. 22, 1970
[73] Assignee John E. Smith's Sons Co., Div. of Hobam, Inc.
 Buffalo, N.Y.,
 a corporation of New York

[54] MEAT CUTTING MACHINE
 6 Claims, 20 Drawing Figs.
[52] U.S. Cl. ................................................. 146/67
[51] Int. Cl. ................................................. B02c 18/12, B02c 18/22
[50] Field of Search ........................................ 146/67, 95(Cursory)

[56] References Cited
 UNITED STATES PATENTS
1,907,621 5/1933 Van Berkel .................. 146/102

| | | | |
|---|---|---|---|
| 2,177,600 | 10/1939 | Schmidt ..................... | 146/67 |
| 2,711,270 | 6/1955 | Gulbrandsen ............... | 146/67 |
| 2,937,679 | 5/1960 | Dorfel ........................ | 146/67 |
| 2,966,186 | 12/1960 | Garapolo .................... | 146/95 |
| 3,133,571 | 5/1964 | Hensgen et al. ............. | 146/95 |

Primary Examiner—Willie G. Abercrombie
Attorney—Sommer, Weber & Gastel

ABSTRACT: A meat cutting machine including a rotatable annular bowl driven by a variable speed hydraulic motor and a knife assembly in said bowl driven by an electric motor at predetermined selected speeds and an hydraulic system for operating accessories on the meat cutter including a cover for the knife, an unloader and lifts or loaders for dumping meat into the bowl, the bowl forming a labyrinth seal at its outer edge with a bowl ring portion of the housing to prevent meat, which can provide a focal point for contamination, from entering underneath the bowl, and the bowl being centrally suspended by a shaft which drives said bowl, and electrical circuit means for the machine which selectively permit either manual or automatic programmed operation of the machine.

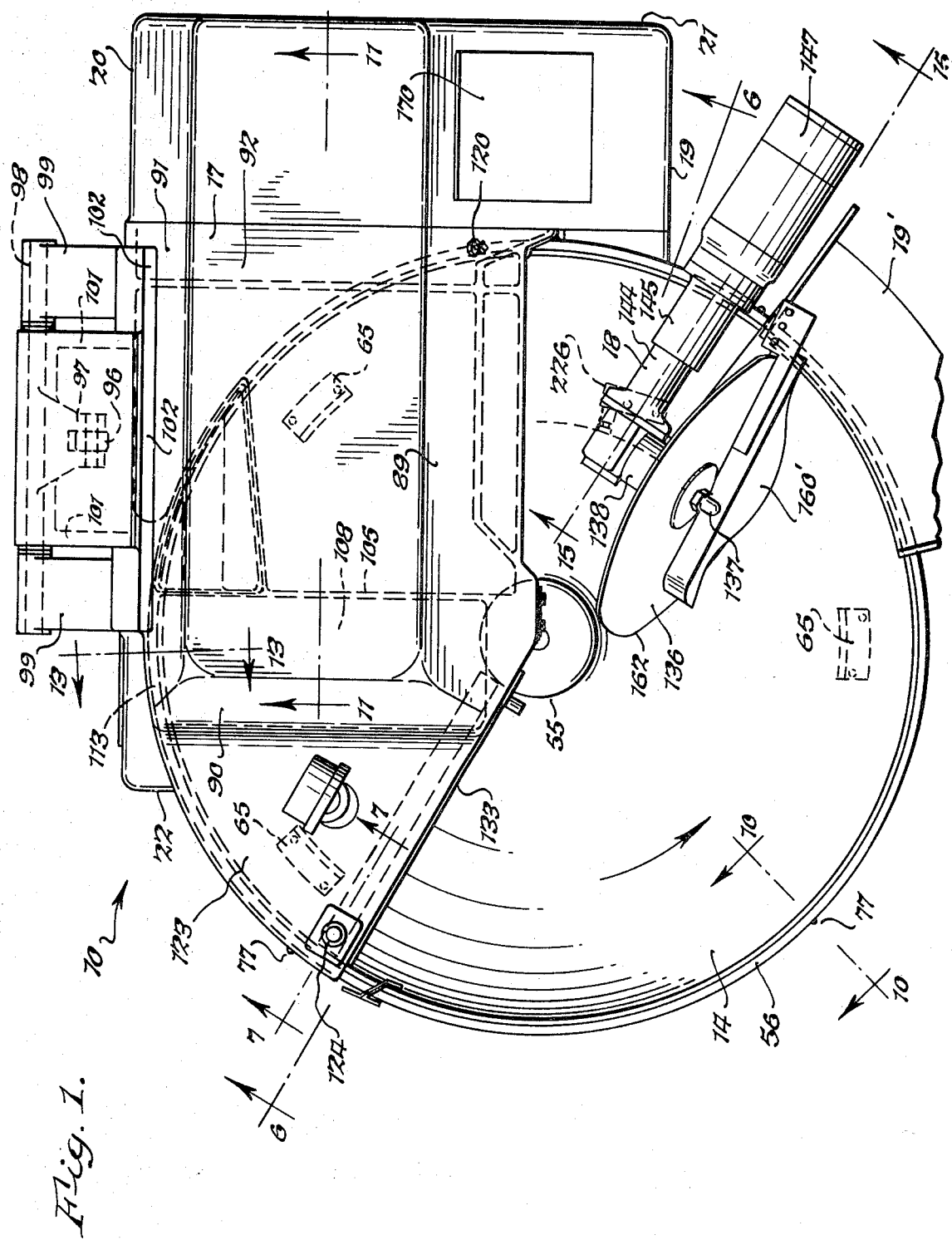

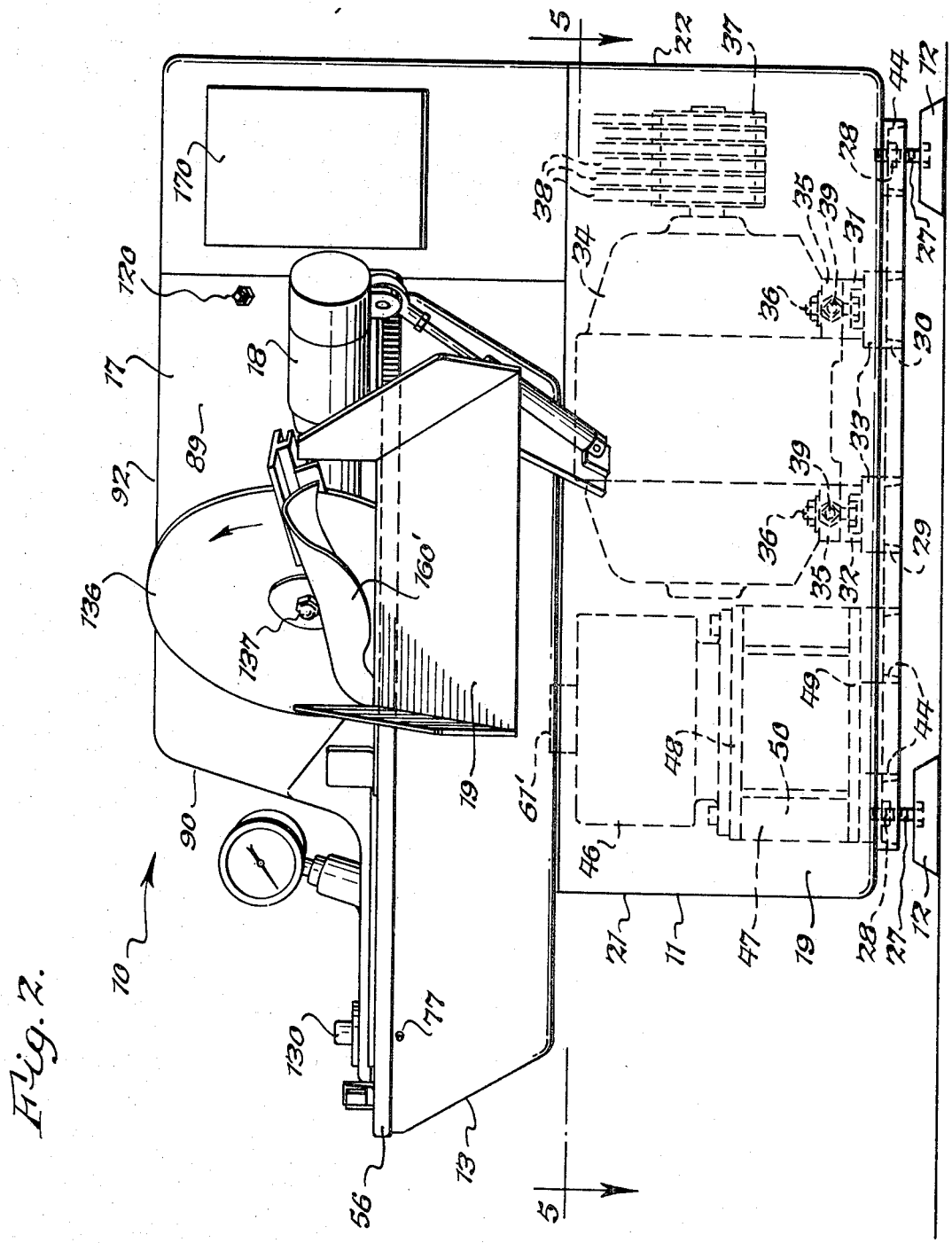

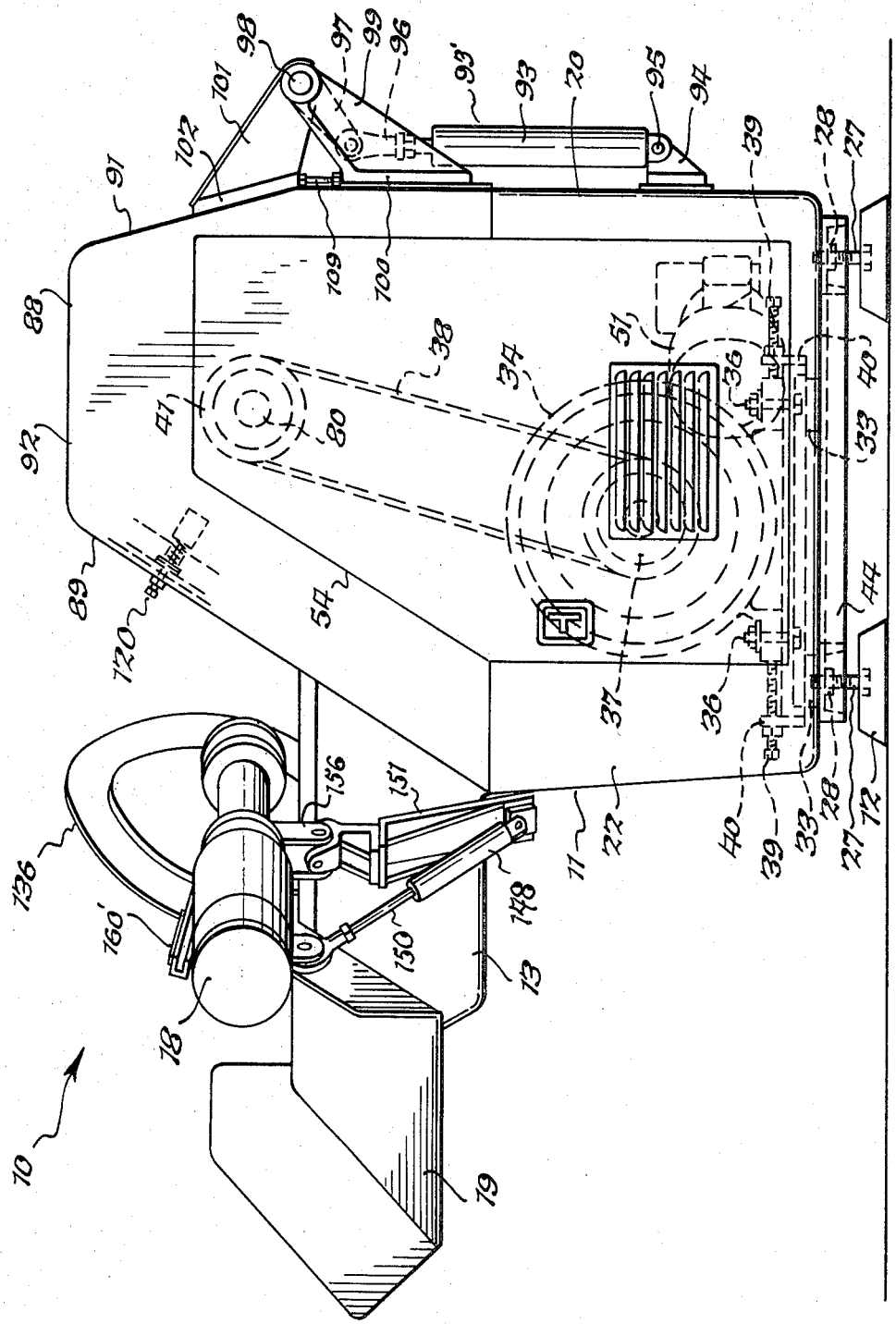

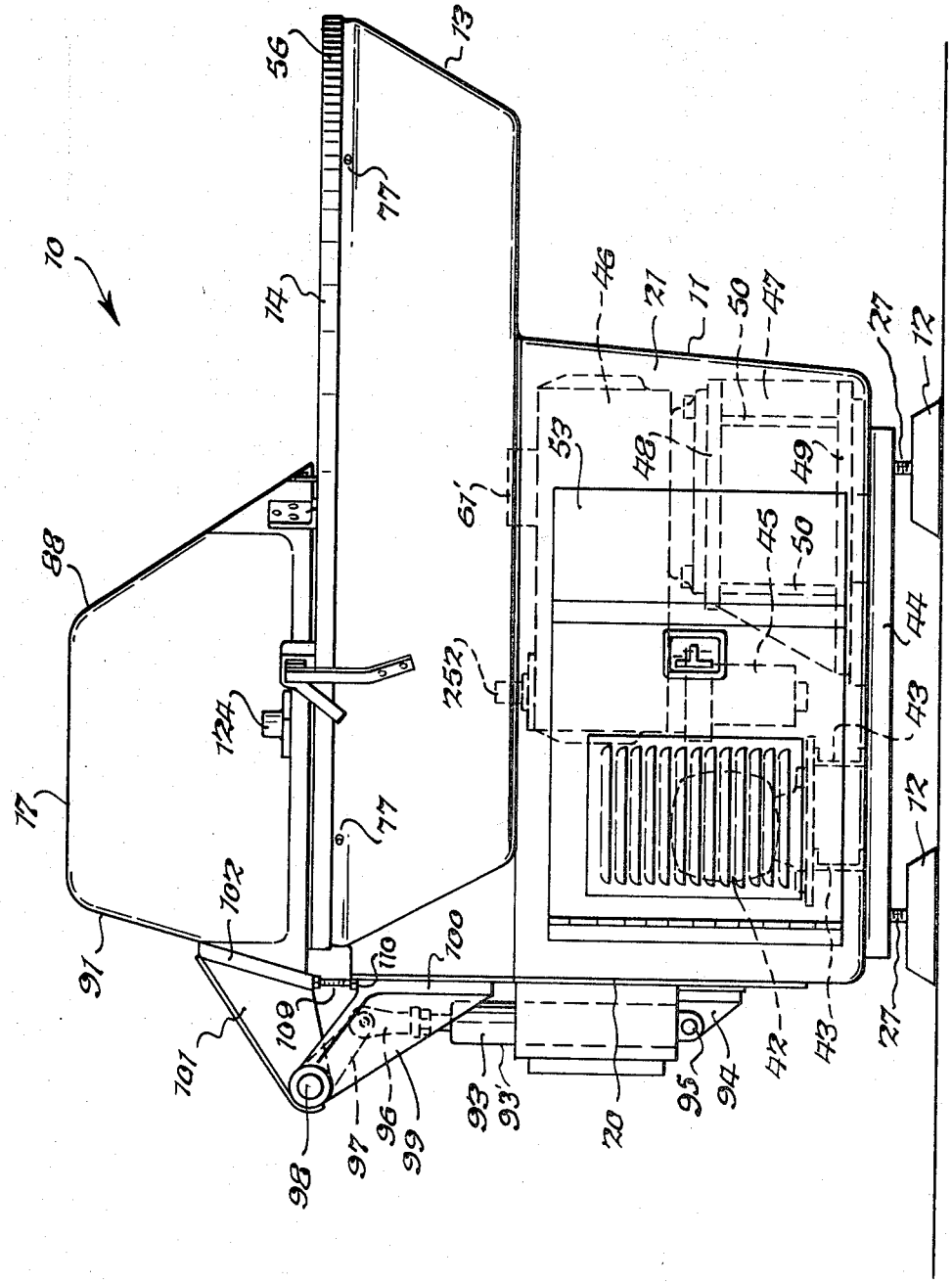

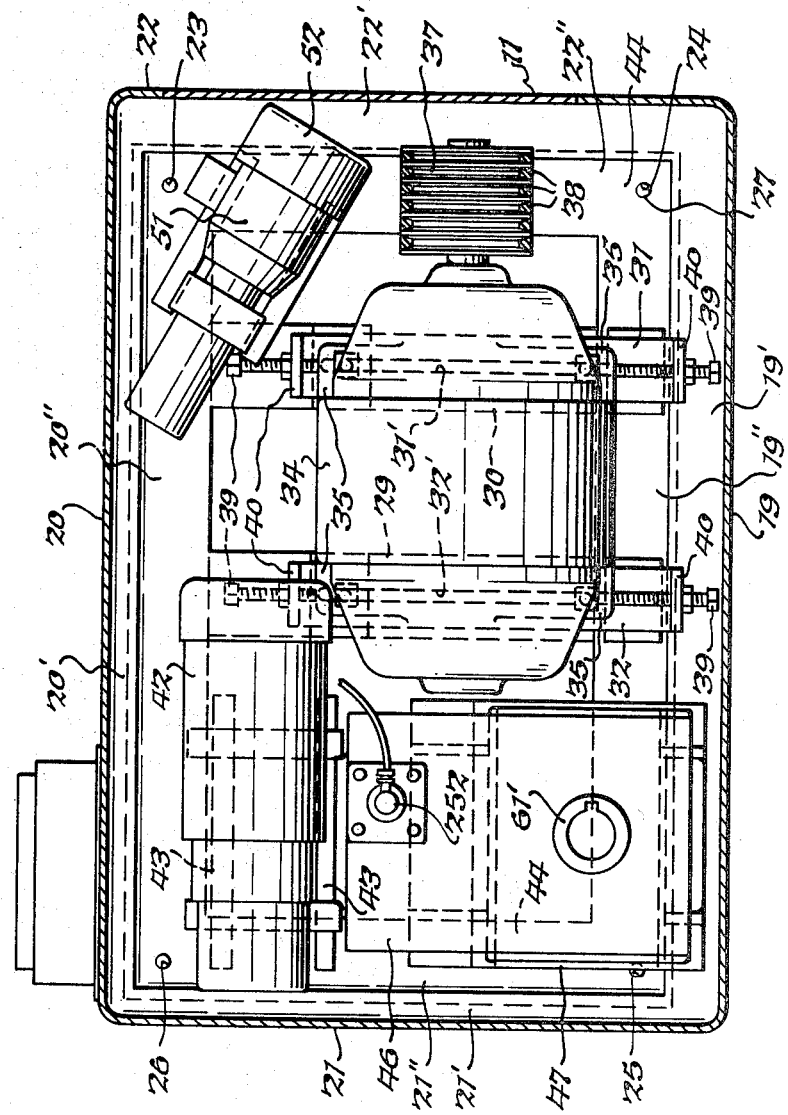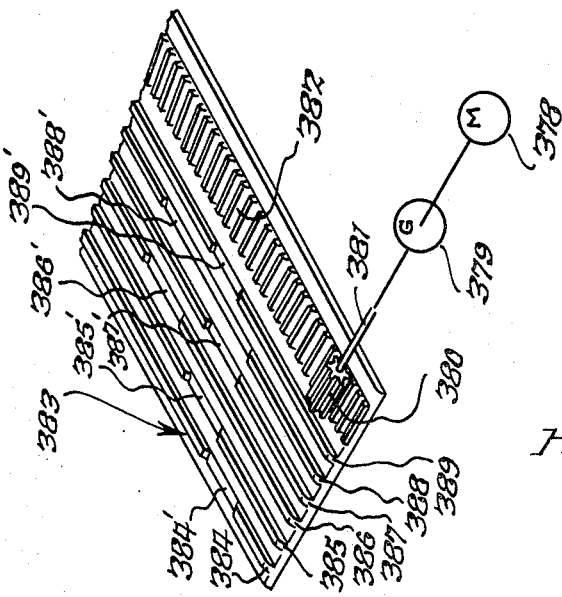

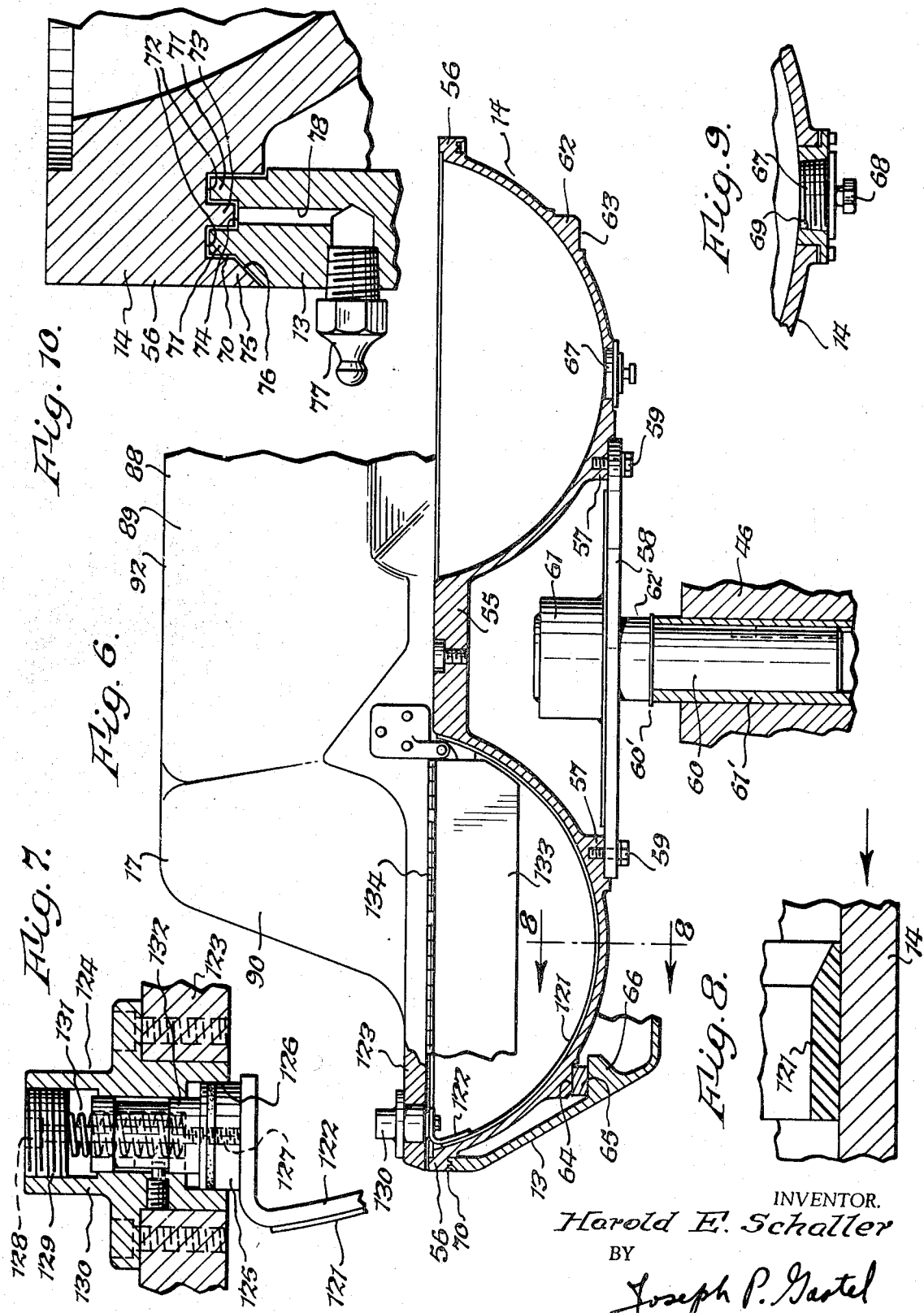

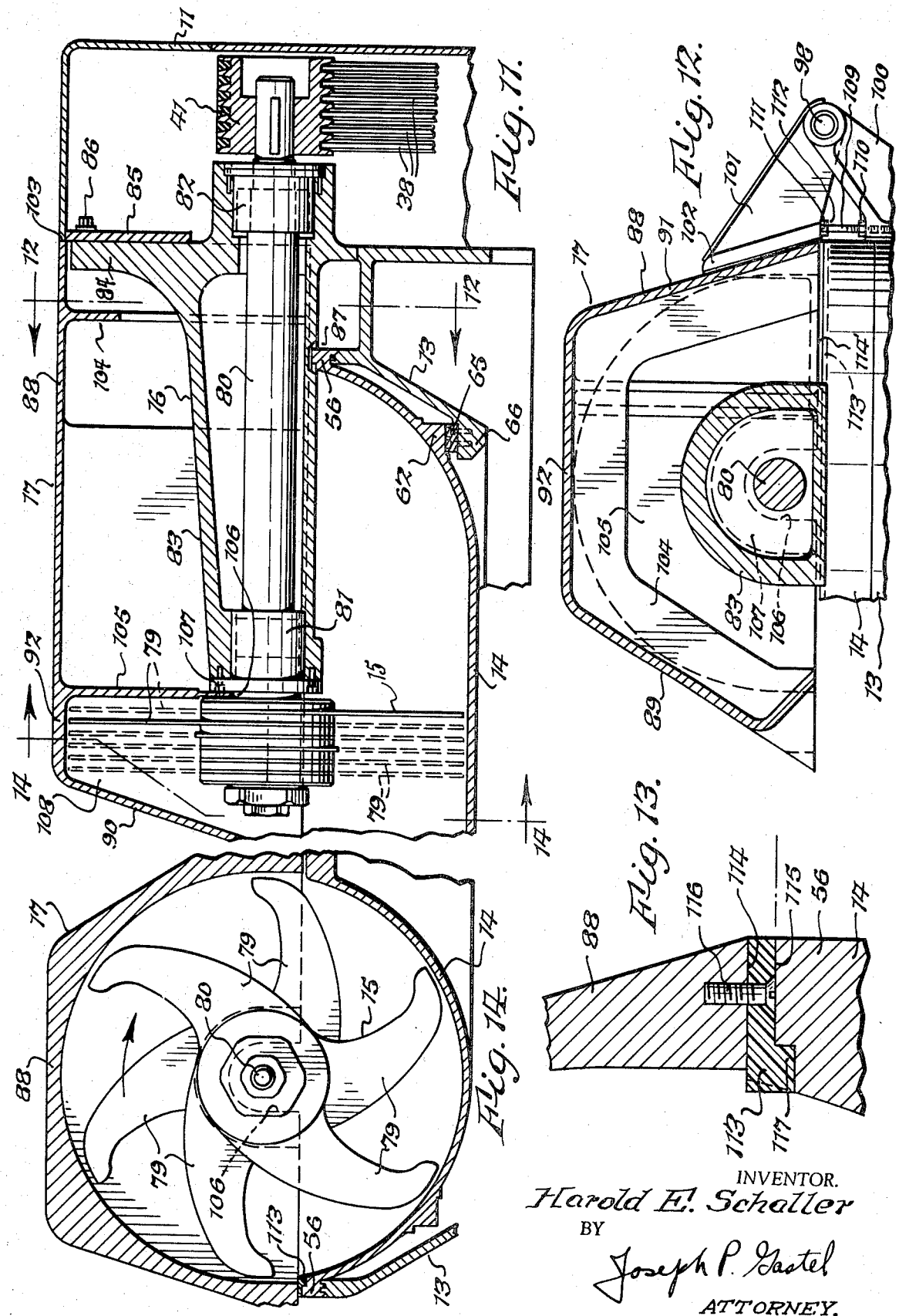

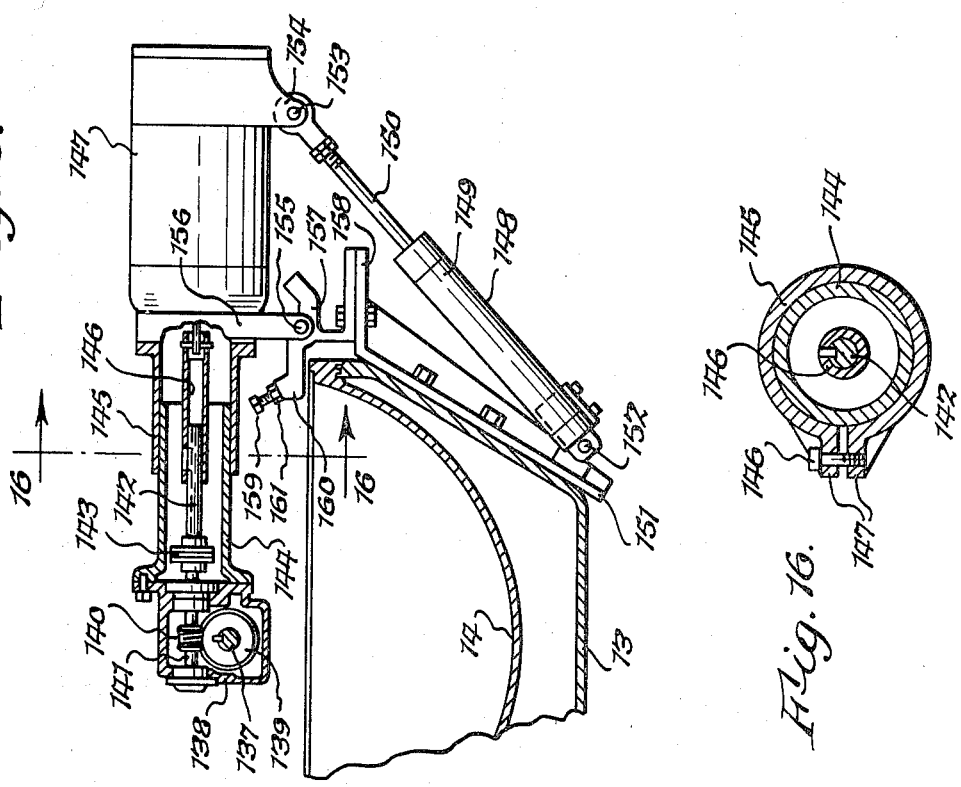

3,548,901

MEAT CUTTING MACHINE

BACKGROUND OF THE INVENTION

The present invention relates to an improved meat cutting machine of the type which is capable of chopping large quantities of meat into small portions in an extremely rapid manner.

In the past, meat cutting machines were generally not too versatile, that is, certain machines were used for providing a coarse-cut product and other machines provided ultrafine emulsions. In addition, in the past, there has been a problem with respect to sanitation in meat cutting machines in the sense that cut meat could enter the space between the bowl and the housing of the machine and provide focal points for contamination. Furthermore, in the past meat cutting machines were generally manually operated, that is, an operator would select the bowl speed and the knife speed and time the length of cutting. However, this gave rise to certain problems in that the quality of the finished product often varied with the skill of the operator. Considering that machines of the type described here are capable of chopping a load of 800 pounds at one time, an error in cutting could very often give rise to a large economic loss if the resulting product was not suited for its intended purpose. It is with the overcoming of the foregoing shortcomings that the present invention is concerned.

SUMMARY OF THE INVENTION

It is accordingly one object of the present invention to provide an improved meat cutting machine which is capable of providing infinite combinations of relative speeds of the bowl and knives, thereby making the machine manifestly suitable for any cutting requirement, from a coarse cut product to ultrafine emulsions. A related object of the present invention is to provide an improved meat cutting machine which has an unique drive system in which the knives are driven by an electric motor and the bowl is driven by an infinitely variable speed hydraulic motor. A further related object of the present invention is to provide an improved meat cutting machine in which auxiliary hydraulic circuits are provided for driving the accessories associated with the machine so that these will operate independently of the hydraulic drive for the bowl, thereby obviating any possibility that the operation of the auxiliary equipment will in any way interfere with bowl operation.

Another object of the present invention is to provide an improved drive for a meat cutting machine in which the bowl is centrally suspended in an unique manner so as to remain substantially balanced under all loading conditions. A related object of the present invention is to provide a stabilizing construction between the bowl and its supporting structure which normally is inactive but comes into play only to prevent the bowl from moving offcenter when unbalanced.

A further object of the present invention is to provide an improved meat cutting machine having an improved sealing arrangement between the bowl and its supporting structure, thereby practically obviating any possibility of contamination resulting from the entry of meat particles between the bowl and its supporting structure. A related object of the present invention is to provide an improved meat cutting machine in which the bowl supporting structure is so associated with the improved seal so that the seal is protected against damage in the event of unbalancing of the bowl.

Another object of the present invention is to provide an improved meat cutting machine which can be programmed in an extremely simple and efficient manner to provide a product of consistent quality. A related object of the present invention is to provide an improved meat cutting machine which includes an automatic programming circuit which is extremely simple and efficient in construction and operates without requiring excessive relays or other complex wiring. Other objects and attendant advantages will readily be perceived hereafter.

The improved meat cutting machine of the present invention includes a centrally supported annular bowl which is driven by a variable speed hydraulic motor. A knife assembly extends into the bowl transversely to its direction of rotation whereby the bowl brings meat into engagement with the knives. The bowl includes an improved labyrinth seal between its edge and the bowl skirt associated therewith to prevent meat particles, which can provide focal points for contamination, from entering the space between the bowl and the skirt. The hydraulic drive for the bowl is controlled by an electric motor which varies the flow from a pump to the motor to thereby adjust the speed of the bowl to any desired value, thereby providing efficient speed control in a simple manner. In addition, an automatic programming circuit is associated with the machine which permits exact repetition of any programmed meat cutting cycle, as desired, as so as to permit the machine to be used to duplicate any predetermined formula with extremely great accuracy.

The present invention will be more fully understood when the following portions of the specification are read in conjunction with the accompanying drawings wherein:

BRIEF DESCRIPTION OF THE DRAWINGS

FIG. 1 is a plan view of the improved machine of the present invention;

FIG. 2 is a front elevational view of the machine shown in FIG. 1;

FIG. 3 is a side elevational view taken from the right of FIGS. 1 and 2;

FIG. 4 is a side elevational view taken from the left of FIGS. 1 and 2;

FIG. 5 is a view partially in cross section taken substantially along line 5–5 of FIG. 2 and showing the various components utilized to drive the machine;

FIG. 6 is a view partially in cross section taken substantially along line 6–6 of FIG. 1 and showing the manner in which the bowl is suspended;

FIG. 7 is an enlarged view partially in cross section taken substantially along line 7–7 of FIG. 1 and showing the mechanism for suspending the bowl scraper;

FIG. 8 is a view partially in cross section taken substantially along line 8–8 of FIG. 6 and showing the relationship between the bowl and the bowl scraper;

FIG. 9 is an enlarged view showing the manner in which the plug is mounted in the bottom of the bowl;

FIG. 10 is an enlarged view partially in cross section taken substantially along line 10–10 of FIG. 1 and showing in enlarged form the labyrinth seal and the grease fitting for conducting grease to the labyrinth seal between the bowl and bowl ring;

FIG. 11 is a fragmentary cross-sectional view taken substantially along line 11–11 of FIG. 1 and showing the spindle assembly and cover which is associated with the knives;

FIG. 12 is a view partially in cross section taken substantially along line 12–12 of FIG. 11 and showing the relationship between the spindle assembly and the cover;

FIG. 13 is a fragmentary view in cross section taken substantially along line 13–13 of FIG. 1 and showing the mechanism for effecting the sealing relationship between the cover and the bowl;

FIG. 14 is a view taken substantially along line 14–14 of FIG. 11 and showing the relationship between the knives, bowl and cover when the cover is closed;

FIG. 15 is a view, partially in cross section, taken substantially along line 15–15 showing the unloader mechanism and its relationship to the bowl and bowl ring;

FIG. 16 is a cross-sectional view taken substantially along line 16–16 of FIG. 15 and showing the mechanism for adjusting the unloader;

FIG. 17 is a front elevational view of the control panel which is mounted on the machine;

FIG. 20 is a fragmentary perspective view of a programming card which is utilized to effect automatic operation.

DESCRIPTION OF THE PREFERRED EMBODIMENTS

Figure 18:
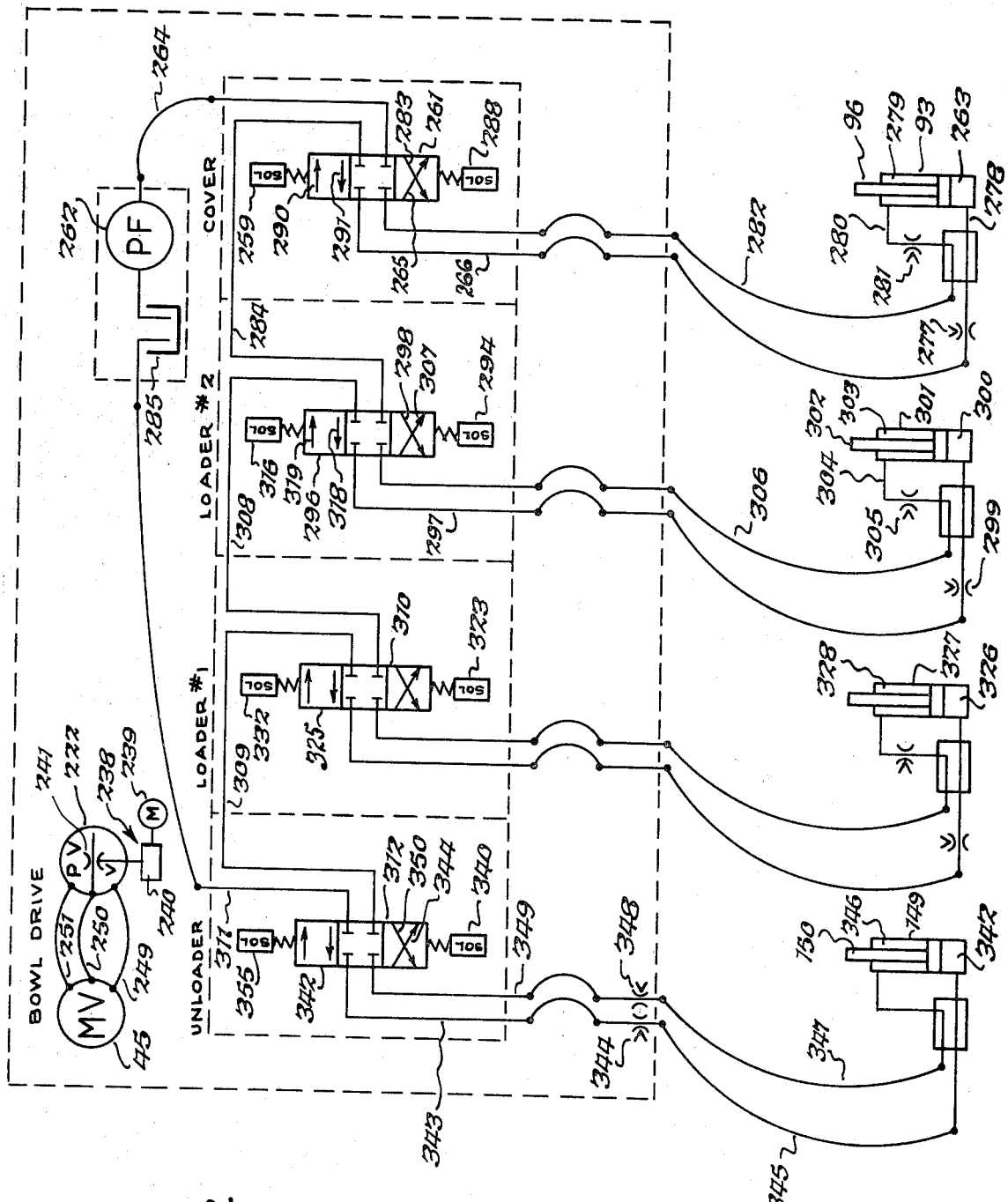
FIG. 18 is a schematic hydraulic diagram for the machine.

Broadly, the improved meat cutting machine 10 includes a base assembly 11 adjustably mounted on four frustoconical resilient pads 12 and mounting in turn a generally inverted frustoconical annular bowl ring 13 which surrounds an annular trough-like bowl 14. A knife assembly 15 (FIG. 11) is mounted on a spindle assembly 16 which in turn is mounted on the base 11. A selectively openable cover 17 is also mounted on base assembly 11. An unloader 18 for removing chopped meat from bowl 14 is mounted on bowl ring 13 for movement into and out of bowl 14 for selectively unloading meat by causing it to move into chute 19 mounted on bowl ring 13 from which it passes to suitable containers or conveyors (not shown).

In its more specific aspect, base assembly 11 is fabricated from plate steel to a rectangular configuration in plan and includes front wall 19, rear wall 20 and side walls 21 and 22. As can be seen from FIG. 5, the bottom portions of walls 19, 20, 21 and 22 are turned under at their lowermost portions to form flanges 19'20'21' and 22'respectively. Welded to the flanges 19'20'21' and 22' are plates 19"20"21" and 21"respectively. Tapped apertures 23, 24, 25 and 26 are located at the junctions of the plates, and threaded screws 27 extend there through and are locked at any desired elevation by the lock nuts 28 associated therewith to level the machine. Preferably the screws 27 are installed with their heads engaging pads 12 to thereby provide a bearing surface on said pads. Plates of metal, not shown, cover the tops of resilient pads 12 to distribute the weight of the machine over the entire surface of the pads.

Channels 29 and 30 have their opposite ends welded to plates 19" and 20". These channels in turn mount elongated track members 31 and 32 on spaced blocks 33 (FIG. 2) underlying each of these elongated tracks. Track 31 has slot 31' running longitudinally thereof and track 32 has slot 32' running longitudinally thereof. Mounted on tracks 31 and 32 is a two-speed electric motor 34 having four spaced feet 35 through which bolts 36 extend, said bolts riding in the slots 31' and 32' of tracks 31 and 32, respectively. It will be appreciated that when these bolts are tightened, motor 34 is firmly affixed to the base of machine 10. However, in the event it is desired to adjust the position of motor 34, as for example, as required in tightening the belt 38 which is mounted on pulley 37, it is merely necessary to loosen each of said bolts 36 and thereafter adjust bolts 39 (FIG. 5) which are mounted in upstanding end plates 40 at the ends of tracks 31 and 32. Electric motor 34 is for the purpose of driving knives 15 through belt 38 which extends between motor pulley 37 and knife spindle pulley 41.

The remainder of the drive for the machine is hydraulic, that is, the drive for rotating bowl 14, for opening and closing cover 17, and for raising and lowering unloader 18. The hydraulic pressure for driving bowl 14 is provided by a unit denoted by numeral 42 and being shown in FIGS. 4 and 5, hydraulic unit 42 being mounted on spaced channels 43 which extend across channels 44 which extend between plates 19" and 20". Hydraulic unit 42 is for the purpose of providing a source of hydraulic pressure, and essentially includes a pump 222 (FIG. 18) and a quantity of hydraulic fluid. The output of the pump 222 associated with unit 42 drives hydraulic motor 45 which is coupled to gear reducer 46 which, in turn, is mounted on base 47 consisting of upper and lower plates 48 and 49 connected by side plates 50, said base 47 being suitably attached to channels 44 (FIG. 2).

Also mounted within housing 11 is an hydraulic unit 51 including an hydraulic pump 262 (FIG. 18). Unit 51 is mounted on a base 52 which is suitably secured to plates 22' and 20'. Unit 51 serves the function of providing pressurized hydraulic fluid for driving the hydraulic motors associated with the cover assembly 17, the unloader assembly 18, and certain loaders (not shown). It is to be especially noted that unit 51 is completely separate and independent of hydraulic unit 42. Therefore, the operation of the accessories in no way affects the bowl. Door 53 is located in wall 21 for providing access to the elements on that side of housing 11 and door 54 is located in wall 22 to provide access to those elements located on that side of the housing.

The meat which is to be cut is placed into bowl 14 which, as noted above, is essentially an annular trough having a central hub portion 55 (FIG. 6) and an annular lip or rim 56. An annular inner rim 57, FIG. 6, mounts a plate 58 by means of spaced screws 59. A shaft 60 is affixed within a housing 61 mounted on plate 58. Shaft 60 is effectively keyed to hollow rotatable shaft 61' in gear reducer 46. A shim 60' is used to vary the elevation of shaft 60, shim 60' being located between shaft 61' and collar 62' on shaft 60. Bowl 14 is supported only at the central location at shaft 60, thereby obviating any necessity to drive the bowl from an offcenter position. An outer lower annular rim 62 is provided on bowl 14. This rim includes a lower surface 63 which runs with a clearance of approximately .005 of an inch above the top surfaces 64 of bearing blocks 65 (FIG. 1) which are spacedly mounted on supports 66 (FIG. 6) extending inwardly from bowl ring 13. As can be seen from FIG. 1, there are three bearings 65 mounted on bowl ring 13 at circumferentially spaced points. The only time that the undersurface 63 of rim 62 will engage any of bearings 65 is in the event that the bowl 14 becomes unbalanced. Otherwise, the bowl 14 will clear bearings 65. Actually, therefore, bearings 65 function as a safety device to prevent excess deflection of bowl 14 and its associated structure in the event of severe unbalancing. At this point it is to be noted that bowl 14 includes a single plug 67 which is threaded into it. Plug 67 includes a nut head 68 which can receive a wrench. Plug 67 is removed when it is desired to wash bowl 14, the wash water draining through open hole 69 when plug 67 is removed.

As can be seen from FIGS. 8 and 4, bowl 14 rotates while bowl ring 13 remains stationary. Furthermore, it can be seen that there is a space between the outside of bowl 14 and the inside of bowl ring 13. If meat particles should accumulate in this space, they could serve as a focal point for contamination. Accordingly, an unique sealing arrangement is provided to prevent meat particles from entering between bowl 14 and bowl ring 13. This seal is best shown in FIG. 10 and comprises a labyrinth 70. More specifically, bowl ring 13 includes a pair of annular upwardly extending ridges 71 and bowl 14 includes in the rim 56 thereof annular grooves 72 which receive ridges 71. In addition, rim 56 includes an annular downwardly extending ridge 73 which is received in annular groove 74 in bowl ring 13. The outside of rim 56 includes a lip 75 which is extremely close to edge 76 of the bowl ring. It is to be noted that the clearance between the adjacent parts of the labyrinth seal is greater than .005 of an inch, which is the clearance between rim 62 and bearings 65. Therefore, in the event there should ever be a sufficient unbalance to cause rim 62 to engage bearings 65, this will occur before the sides of the labyrinth seal can engage each other, thereby preventing destruction or enlargement of this seal.

As can be seen from FIGS. 2, 4 and 10, a plurality of grease fittings 77 are positioned at circumferentially spaced locations on bowl ring 13. These fittings are of the type normally used for lubricating automobile parts and machine parts. In communication with each fitting 77 is a bore 78 in bowl ring 13 for conducting grease into labyrinth 70. In operation, therefore, the bowl is rotated and grease is supplied to the labyrinth through the grease fittings 77 and the grease will occupy the entire annular clearance between the adjacent parts forming the labyrinth seal to thereby function as a packing which prevents meat particles from entering into the space between bowl 14 and bowl ring 13.

As noted above, the meat cutting machine of the present invention includes a knife assembly 15 which is used to cut the meat which is carried to it by the rotation of the bowl 14 in a counterclockwise direction in FIG. 1. More specifically, a plurality of knife blades 79 are mounted in axially spaced relationship on the end of spindle 80 which, in turn, is mounted at spaced locations in bearings 81 and 82 carried by spindle housing 83. Spindle 80 is driven from electric motor 34 by means of belts 38 which encircle motor pulley 37 and pulley 41 keyed to spindle 80. The knife assembly 15 may be identical in all respects to that shown in copending application Ser. No. 634,282 filed Apr. 27, 1967, now U.S. Pat. No. 3,491,818, in the name of Harold E. Schaller, or assembly 15 may be of the type disclosed in U.S. Pat. No. 2,804,112 issued to Harold E. Schaller. The spindle assembly 16 has a flange 84 at the end of housing 83 and this flange is attached to flange 85 on base housing 11 by means of a plurality of spaced screws 86, only one being shown in FIG. 11. As can be seen from FIG. 11, the underside of housing 83 includes a milled slot 87 in which bowl rim 56 rides.

The machine 10 is also provided with a knife cover assembly 17 which is in the closed position in the drawings but which is opened to permit access to the knife assembly 15 for cleaning or replacement, as required. More specifically, cover 17 includes a housing portion 88 having a front wall 89, a side wall 90, and a rear wall 91 and a top wall 92. To open and close cover housing 88, a hydraulic motor 93 (FIGS. 3 and 4) consisting of a piston 96 and cylinder 93' is provided. The lower end of cylinder 93' is pinned to bracket 94 by means of pin 95, bracket 94 being attached to rear wall 20 of the housing. The piston 96 which extends from cylinder 93' is pinned to arm 97 which is rigidly keyed to shaft 98 having its opposite ends journaled in spaced brackets 99 (FIG. 1) having vertical portions 100 rigidly secured to rear wall 20 of housing 11. Shaft 98 in turn has a pair of spaced arms 101 extending therefrom which mount plate 102 which is secured to the rear 91 of cover housing 88 by means of suitable bolts, not shown. Arms 97 and 101 function as a bellcrank lever in conjunction with shaft 98 to pivot cover housing 88 in a clockwise direction (FIG. 4) to close it and a counterclockwise direction to open it, as piston 96 moves downwardly and upwardly, respectively.

The cover housing 88 includes an end 103 which lies in contiguous relationship to flange 85 when the cover is closed (FIG. 11). In addition, it includes an inverted U-shaped stiffening rib 104 (FIGS. 11 and 12), said stiffening rib extending across walls 89, 91 and 92. In addition, cover housing 88 includes an inverted U-shaped wall 105 integral with housing walls 89, 91 and 92. Wall 105 has an opening 106 which is adjacent the edge 107 of plate 105, said edge 107 being received between the end of spindle housing 83 and the hub structure (not numbered) which mounts the knives on spindle 80. This effectively provides a seal-like arrangement which prevents flying meat from leaving chamber 108 which is defined by plate 105 and wall 90, and portions of top wall 92, front wall 89 and rear wall 91. In other words, the meat which is turbulently being flung about within chamber 108 cannot fly to the right in FIG. 11 onto spindle housing 83 but is confined within chamber 108 for cutting efficiency. It will be appreciated that the meat to be cut is fed to knife assembly 15 by the rotation of bowl 14.

A pair of spaced screws 109, (FIGS. 4 and 12), extend upwardly from plate 100 and have locknuts 110 mounted thereon. These screws function to provide a positive stop which prevents the cover housing 88 from exceeding a predetermined movement in a counterclockwise direction in FIG. 12 (clockwise in FIG. 4). This is necessitated because pressure is maintained in the fluid motor 93 while the cover housing 88 is closed and therefore the limit of movement of cover housing 88 in a counterclockwise direction (FIG. 12) must be predetermined to prevent it from acting as a brake on the rotating bowl 14. It is spaced bolts 109 which limit this counterclockwise movement by virtue of the engagement between the heads 112 of bolts 109 and the undersurface 111 of plate 102.

As can thus be seen from FIG. 1, the cover housing 88 includes a portion which overlies rim 56 of bowl 14. Also see FIG. 13. This portion includes a seal to prevent flying meat from being thrown outwardly from the machine. In this respect, an arcuate stepped metal sealing strip 113 is attached to the lower edge 114 of the portion of cover 88 which is adjacent to rim 56. This portion is a wall 114' (FIG. 12) which forms the bottom portion of the cover. Sealing strip 113 is arcuate and extends from an area substantially adjacent the right side of spindle housing 83 in FIG. 12 all the way to the portion of wall 90 of the housing. There is a clearance between the undersurface 115 of sealing strip 113 and the top of the rim 56 of bowl 14 when the cover housing 88 is in closed position so that it does not act as a brake. Sealing strip 113 is attached to cover housing 88 by means of a plurality of longitudinally spaced screws 116. As can be seen, sealing strip 113 includes a lip 117 which provides a lapped joint with the inner edge of rim 56 to thereby effect an extremely good sealing engagement therewith.

It is to be noted at this point that a safety switch 120 is mounted on wall 89 of cover housing 88. This switch can be closed only when the cover housing 88 is closed, by virtue of engaging a fixed part of the machine. This is a safety feature in that the safety switch 120, as will become more apparent hereafter, is closed, only when the cover is closed, to permit the circuit to be completed to the knife assembly 15. Therefore, knife assembly 15 cannot operate unless the cover housing 88 is closed.

A bowl scraper arrangement is provided for separating the chopped meat from the inside surface of bowl 14 as it leaves the knife zone. In this respect, it can be seen from FIGS. 6 and 8 that an arcuate band 121 has one end thereof affixed to bracket 122 which is resiliently mounted on the planar end 123 of cover assembly 17 by means of a mounting 124 consisting of a plug 125 which can move up and down in aperture 126, said plug receiving the end of screw 127 which has its head 128 received in plug 129 which is threaded into housing 130 any predetermined amount. An helical spring 131 encircles screw 127 and has its upper end bearing on the underside of plug 129 and its lower end bearing on plug portion 132 which is an extension of plug 125. It can therefore be seen that plug 125, which carries bracket 122, is biased to a lowermost position by spring 131 but it can yield upwardly against the bias of the spring. The other end of band scraper 121 is mounted on a bracket (not shown) which is pivotally attached to the underside of cover housing 88.

Also mounted on the end of portion 123 of cover 17 is a dust plate 133 which tends to confine dust in the knife zone, said dust being formed by flour or other powdered material which may be added to the meat being chopped. Plate 133 is secured to the edge of cover portion 123 by means of a suitable hinge 134 to permit plate 133 to be raised or lowered as required.

Also included in the machine of the present invention is an unloader assembly 18 which is used to selectively remove chopped meat from bowl 14. In this respect it will be appreciated that bowl 14 rotates in a counterclockwise direction in FIG. 1. Thus, the meat which leaves the cutting zone will move toward disc 136. In the drawings disc 136 is shown in a position wherein it obstructs or intercepts the chopped meat within bowl 14. However, it will be appreciated that during the cutting operation the disc 136 is in a retracted position wherein it lies above bowl 14. More specifically, disc 136 is mounted on shaft 137 (FIGS. 1 and 15) which is located within housing portion 138 and carries gear 139 which meshes with worm 140 mounted on shaft 141 which is coupled to splined shaft 142 by coupling 143, said latter elements being located within housing portion 144 which can telescope relative to housing portion 145 when the screws 146 (FIG. 16) extending between lips 147, are loosened. Splined shaft 142, in turn, is received in telescoping relationship within tubular shaft 146 which in turn is driven by a motor, not shown, carried within motor housing 147.

An hydraulic motor 148 consisting of a cylinder 149 and a piston 150 has its lower end attached to bowl ring 13 by means of bracket 151 which pivotally mounts the lower end of cylinder 149 at pin 152. Piston 150, in turn, is pinned at 153 to lobe 154 at the end of motor housing 147. It will be appreciated that whenever piston 150 is pulled into cylinder 149 the motor housing 147 and its associated housings 144 and 145 will pivot in a clockwise direction (FIG. 15) by virtue of the pivotal connection at 155 between arm 156 extending downwardly from motor housing 147 and bracket 157 mounted on the top ledge 158 of bracket 151 which is secured to said bowl ring by screws, not numbered. In order to limit the downward or counterclockwise movement in FIG. 15 of the unloader as it is moved into position into bowl 14, a screw 159 is provided which can be adjusted upwardly or downwardly by virtue of being threaded into arm 160 extending from bracket 157, said screw 159 being locked in adjusted position by means of a lock nut 161. A plow 160' which is essentially a blade, lies across the face of disc 136 in the direction from which the meat is coming and is supported by a bracket (not shown) which is attached to housing 138. This plow lies between shaft 137 and the edge of the disc toward chute 19 so that as meat piles up against disc 136 after it is rotated upwardly by the rotation of said disc 136, it will move against the plow 160' and the rotation of disc 136 will cause the cut meat to be forced to the right in FIG. 1 onto chute 19. Disc 136 is circular but it is so canted and offcenter relative to annular bowl 114, which in cross section is formed on a radius of a circle, so that the edge 162 of disc 136 will lie very close to the inner surface of bowl 14 to intercept practically all of the meat which is moved against it. As noted above, disc 136 can be moved into and out of the bowl by suitable energization of hydraulic motor 148.

At this point it should be noted that the reason the unloader disc 136 is moved out of the path of movement of the meat is because many times in order to get the desired size to the meat which is cut the bowl has to make a predetermined number of revolutions at a predetermined speed. Therefore, after the meat is dumped into the bowl and the unloader assembly 18 is out of the way, the bowl will be caused to make a certain number of revolutions. After the meat has been chopped to its desired consistency, the unloader disc is pivoted into the path of the meat in the bowl to effect the unloading in the manner described in detail above.

Figure 19:
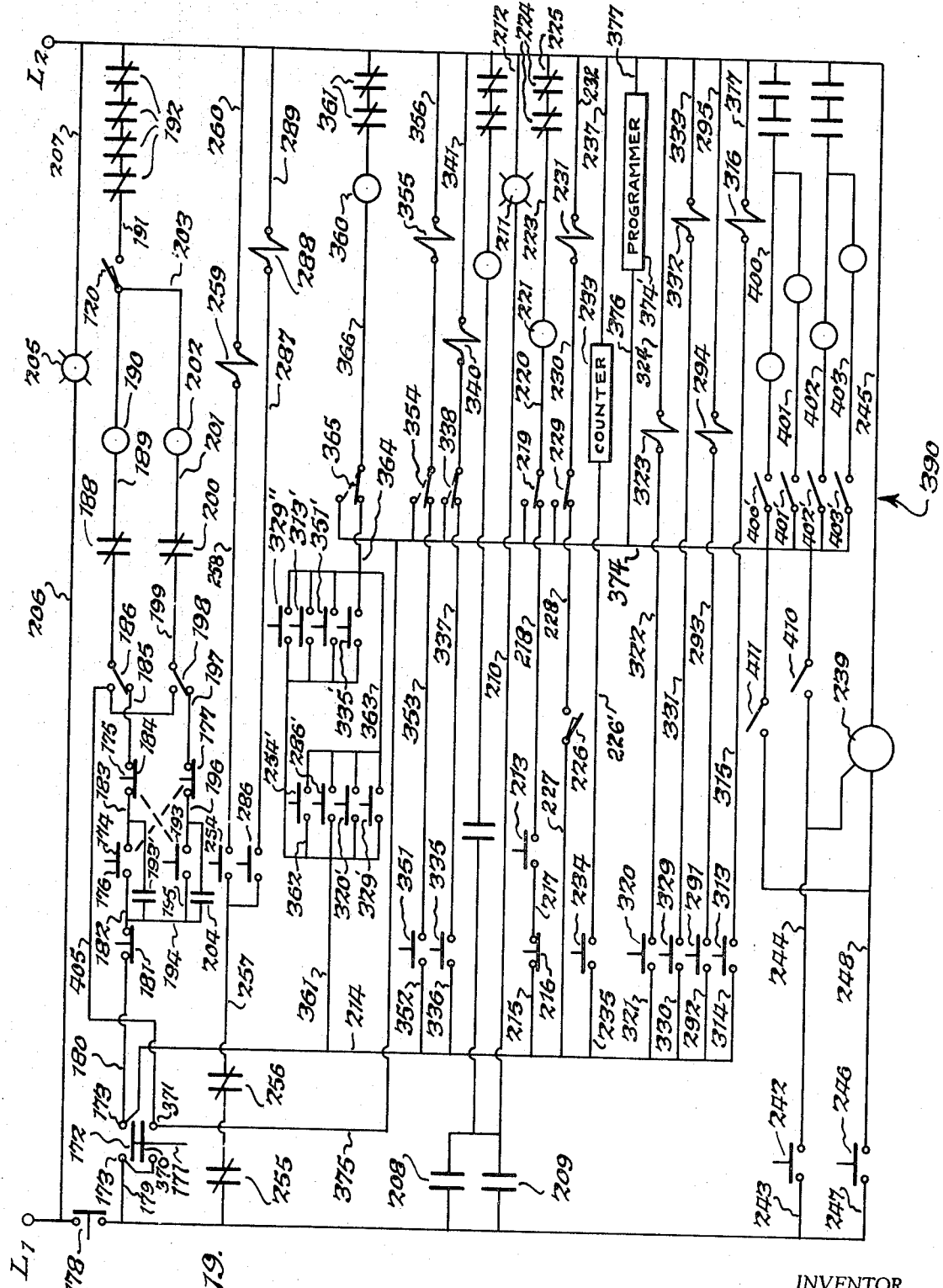
FIG. 19 is a schematic electrical wiring diagram for the machine.

In FIGS. 17, 18 and 19 the electrical and hydraulic circuits are disclosed and these will be described with reference to the previously described mechanical portions of the present machine. The control panel 170 is located on the front of the machine but is shown in FIG. 17 in enlarged form. The machine is capable of providing either manual or automatic operation. The manual operation will be described first. In order to start the machine, switch 171 is moved from its off position to a manual position wherein armature 172 engages contacts 173. Thereafter, either switch 174 or 175 is actuated to provide high or low speed operation of knives 15. More specifically, if switch 174 is actuated, armature 176 will engage the contacts associated therewith and simultaneously armature 177 will move out of engagement with its contacts. This will cause a circuit to be completed between L1 and L2 via normally closed emergency stop switch 178, lead 179, armature 172, lead 180, normally closed knife stop switch 181, lead 182, armature 176, lead 183, normally closed armature 184, lead 185, normally closed switch armature 186, lead 187, normally closed overload relay 188, lead 189, relay coil 190 which actuates the contacts on motor 34 (FIG. 5) which provide slow speed operation, cover limit switch 120 (see also FIG. 2) lead 191, and normally closed overload relays 192. At this point it will be noted that the circuit for actuating knife driving motor 34 can be energized only if limit switch 120 is closed which is the condition it assumes only when the housing cover 88 is closed to encircle the knives 15. After switch 174 is closed, contacts 193' will close to maintain the motor energized after switch 174 is released.

If it is desired to cause high speed operation of electric motor 34, switch 175 is actuated to cause armature 184 to move away from its contact and cause armature 193 to engage its contact which will cause a circuit to be established from lead 182 through lead 194, lead 195, armature 193, lead 196, armature 177, lead 197, armature 198, lead 199, overload relay 200, lead 201, motor relay coil 202 which causes the motor to operate on fast speed, and lead 203 to limit switch 120. Upon the actuation of switch 175 in the foregoing manner holding contacts 204 will close to maintain the motor energized. The "power-on" light 205 is placed in parallel across line L1 AND L2 by leads 106 and 207 to inform the operator that power has been supplied to these lines from the master switch, not shown.

When either the slow or fast switches 174 or 175 have been energized in the above described manner, normally open contacts 208 or 209, depending on which switch was energized, will close to complete a circuit from L1 through lead 210, light 211 and lead 212. This will show that the knives are in operation when the cover is closed inasmuch as this cannot be visually observed from certain areas of the machine. In the event that it should be desired to stop motor 34, it is merely necessary to depress switch 181 to cause the armature thereof to move out of engagement with the contact with which it is associated, and this will disrupt the flow of current through the line in which the switch is located to thereby cause either one of the holding switches 193 or 204 to open so that when armature 181 returns to its position shown in FIG. 19, there will be no circuit to motor 34. In the event it is desired to disrupt the flow of current to any portion of the circuit described hereinbefore or hereafter, it is merely necessary to actuate switch 178 to cause the armature thereof to disrupt the flow of current through line L1.

After the knives have been started in the above-described manner, it is necessary to cause bowl 14 to rotate. This is achieved by closing bowl start switch 213 to thereby complete a circuit between line L1 and L2 via lead 179, armature 172, lead 214, lead 215, normally closed bowl stop switch 216, lead 217, now closed switch 213, lead 218, normally closed switch 219, lead 220, the relay 221 which starts an electric motor (not shown) in unit 42 which drives the pump 222 (FIG. 18) in unit 42, lead 223, overload relays 224 and lead 225 to L2. Operation of the pump 222 will continue until such time as bowl stop switch 216 is actuated to break the circuit between leads 215 and 217. At this point it is to be noted that a counter 233 is provided for the purpose of keeping track of the number of revolutions that the bowl 14 makes, as this is an indication of the consistency of the chopped meat. A dog, not shown, is provided on bowl 14 and it hits limit switch 226 once every revolution of bowl 14 to thereby complete a circuit from lead 214 to line L2 via lead 227, limit switch 226, lead 228, normally closed switch 229, lead 230, counter solenoid 231 and lead 232. Every time solenoid 231 is energized counter 233 will register. Whenever it is desired to reset counter 223 it is merely necessary to close reset switch 234 to zero the counter by establishing a circuit from leads 214 to line L2 via lead 235, reset switch 234, lead 226' counter 233 and lead 237.

It is desirable to control the bowl speed and in this respect the bowl 14 can rotate at any speed between 5 and 20 revolutions per minute. In order to adjust the speed, the flow of hydraulic fluid from pump 222 is varied by a Bodine unit 238 (FIG. 18) consisting of an electric motor 239 (FIG. 19) and a gear reducer 240 which varies the flow through valve 241 associated with pump 222 (see FIG. 18). If it is desired to cause the bowl 14 to rotate at a lower speed, switch 242, (FIGS. 17 and 19) is closed to complete a circuit from L1 to L2 via lead 243, switch 242, lead 244, certain windings in motor 239 and lead 245. This will tend to restrict orifice 241 and lessen the flow from pump 222. If it is desired to speed up bowl 14, switch 246 is closed to complete a circuit from L1 to L2 via lead 247, switch 246, lead 248, another set of windings in motor 239 and lead 245. When the circuit is completed in this manner, the orifice 241 will open to cause a greater flow of hydraulic fluid from pump 222. Suitable conduits 249, 250 and 251 provide the flow to and from hydraulic motor 45, FIGS. 18 and 4. A tachometer drive unit 252 (FIG. 5) is mounted on gear box 46 and communicates the speed to tachometer indicator 253 on instrument panel 170. When the operator sees the actual speed of rotation of bowl 14 on tachometer 253, he can then energize either switch 242 or 246 to alter this speed in the proper direction as required for the particular meat then being cut.

As can be seen from FIG. 18, there is an independent drive between pump 222 and motor 45. Pump 222 serves no other function. However, there is another pump unit 51 consisting of an electric motor (not shown) and a pump 262 for providing pressurized hydraulic fluid for driving the other portions of the machine, such as the cover housing 88, the unloader assembly 18 and loaders to be described hereafter.

If it is desired to raise cover housing 88, it is merely necessary to close switch 254, FIG. 19, to complete a circuit from L1 and L2 via normally closed overload contacts 255 and 256, lead 257, now closed switch 254, lead 258, solenoid 259 and lead 260. This solenoid is shown in FIG. 18 and will cause valve 261 to move from its neutral position to a raised position wherein hydraulic fluid can flow from pump 262 located in unit 51, to chamber 263 in cylinder 93 via conduit 264, valve conduit 265 now in communication therewith, conduit 266, metering valve 277, and conduit 278. By adjusting the size of orifice 277, the rate at which hydraulic fluid is admitted to chamber 263 can be controlled to thereby control the rate at which the cover opens. The exhaust fluid from chamber 279 will flow through conduit 280, metering valve 281, conduit 282, valve conduit 283, and conduit 284 from whence it eventually flows to sump 285, as will be described more fully hereafter. If it is desired to lower the cover into operating position, it is merely necessary to close switch 286 to complete a circuit from line L1 to line L2 via normally closed overload switches 255 and 256, lead 257, now closed switch 286, lead 287, cover lowering relay solenoid 288, and lead 289. As can be seen from FIG. 18, when relay 288 is energized, the conduits 290 and 291 in valve 261 will move into alignment with conduits 284 and 264, respectively, to cause a flow of hydraulic fluid relative to cylinder 93 which is reversed to that described above for raising the cover. In other words, the high pressure hydraulic fluid will be conducted to chamber 279 and chamber 263 will be exhausted.

It will be noted that when the valve 261 returns to its neutral position shown in FIG. 18, conduits 282 and 266 are blocked by the valve so that hydraulic pressure remains in chamber 263 to force the cover closed against opening, that is, the cover is maintained closed hydraulically by the trapping of hydraulic fluid in chamber 263 of cylinder 93.

The valve body 261 is such that when it is in the central position shown in FIG. 18, there is communication between conduit 264 and 284 through the valve body. This permits pressurized hydraulic fluid from pump 262 to be available for operating the other accessories of the machine as required when valve body 261 is in the position shown in FIG. 18. However, when it is in a position wherein it is conducting fluid to or from motor 93, there can be no flow of hydraulic fluid to the remainder of the hydraulically actuated devices, other than the exhaust fluid from motor 93. Thus, the other devices cannot be actuated while the cover is being actuated. For example, there are automatic loaders associated with the machine. These loaders have not been shown in the drawings inasmuch as their construction per se does not form any part of the present invention. The only thing that is pertinent here is that these loaders are actuated hydraulically from pump 262 and therefore the hydraulic circuit for these loaders is shown in FIG. 18. These loaders essentially take a cart full of meat which may weight a few hundred pounds, and through hydraulic mechanism lift and tip the cart to dump this meat into the bowl and thereafter the loaders and carts are lowered so that they return to a position where they deposit the carts on the ground. Accordingly, in the event that it is desired to cause loader or lift No. 2 (FIG. 18) to raise for dumping meat into bowl 14, it is merely necessary to close switch 291 to complete a circuit from lead 214 to L2 via lead 292, now closed switch 291, lead 293, up solenoid 294, and lead 295. This will cause valve body 296 to shift so that conduit 284 is in communication with conduit 297 through conduit 298 in valve 296. This will cause hydraulic fluid to pass through metering valve 299 into chamber 300 of motor 301 to thereby drive piston 302 upwardly and the hydraulic fluid in chamber 303 will be exhausted through conduit 304, metering valve 305, conduit 306, valve conduit 307 and conduit 308 to the sump inasmuch as conduit 308 is in communication with conduit 309 when valve 310 is in the position shown in the drawings and conduit 309 is in communication with conduit 311 when valve 312 is in the position shown in the drawings, conduit 311 being the conduit which leads back to sump 285. In the event it is desired to cause loader or lift No. 2 to lower, it is merely necessary to close switch 313 to establish a circuit between lead 314 and line L2 through lead 314, lead 315, solenoid coil 316 and lead 317. This will cause conduits 318 and 319 in valve body 296 to move into communication with conduits 284 and 308, respectively, leading to and from valve 296, respectively, thereby placing conduits 284 and 308 in communication with conduits 306 and 297, respectively. It will be noted that when valve 296 returns to the position shown in FIG. 18, and this occurs whenever switch 291 or 313 is released, the hydraulic fluid will lock the cylinder 301 in its last position because communication through valve 296 from conduits 297 and 306 is prevented.

If it is desired to raise another loader identified as loader or lift No. 1 in FIG. 18 and on the control panel, it is merely necessary to close switch 320 to establish a circuit between lead 214 and line L2 through leads 321, 322, solenoid 323 and lead 324. This will cause valve 325 to shift so as to supply the lower chamber 326 of cylinder 327 while permitting upper chamber 328 to be exhausted through valve 325. If it is desired to lower the loader or lift No. 1 it is merely necessary to close switch 329 to establish a circuit between lead 214 and line L2 via leads 330, 331, solenoid 332 and lead 333. A detailed explanation of the operation of valve 325 will not be made at this time inasmuch as it functions in all ways in the same manner as does valve 296 described in detail above.

If it is desired to energize the unloader assembly 18, that is, to move disc 136 into bowl 14, it is merely necessary to close switch 335 to establish a circuit between lead 214 and line L2 via lead 336, switch 335, lead 337, normally closed switch 338, lead 339, solenoid 340 and lead 341. This will cause hydraulic fluid to be admitted to chamber 342 of hydraulic motor cylinder 149 (also see FIG. 15). This is achieved because solenoid 340 will cause valve 342 (FIG. 18) to shift so that conduit 309 is in communication with conduit 343 to thereby cause hydraulic fluid to flow from conduit 309 through valve conduit 344 into conduit 343, through metering valve 344 and then into conduit 345 leading to chamber 342. Exhaust hydraulic liquid will travel from chamber 346 through conduit 347, metering valve 348, conduit 349, valve conduit 350 into conduit 311 leading to sump 285. In the event it is desired to raise the unloading disc 136 out of bowl 14, it is merely necessary to close switch 351 to establish a circuit between lead 214 and line L2 via leads 352, 353, normally closed switch 354, solenoid 355 and lead 356 which will cause valve 342 to establish communication between conduit 309 and 349 and between conduit 343 and conduit 311 so as to cause pressurized hydraulic fluid to move into chamber 346 while permitting chamber 342 to be exhausted. Again, it is to be noted that motor 149 will be locked in the position in which valve 342 was neutralized, that is, brought back to the position in which it is shown in FIG. 18. The metering orifices 344 and 348 determine the rate of speed at which the unloader goes into and out of the bowl.

The foregoing description explaining the manner in which the hydraulic circuit functions assumed that there was a source of pressurized hydraulic fluid available at pump 262. However, it is to be noted that pump 262 is energized only on demand. It does not run all the time that the machine is running, that is, it will be caused to operate only when the switches for the unloader, cover or loaders are actually manipulated. As noted above, when there is no demand for hydraulic fluid, the valves shown in FIG. 18 will move to a neutral position and the hydraulic fluid will be locked in the associated cylinders and pistons to cause the machine elements operated thereby to assume the position in which they were last placed. Therefore, there is actually no need to have pump 262 in operation when it is not needed and it can be energized on demand whenever any of the switches discussed above which energize any of the four valves 261, 296, 325 and 342 (FIG. 18) are energized. Accordingly, it will be noted that there are switches in the circuit of FIG. 19 which are energized whenever certain other of the switches are energized to cause a circuit to be completed to hydraulic pump motor 360 (FIG. 19), which drives pump 262 (FIG. 18). More specifically, assume that switch 254 was energized to raise the cover. Switch 254'which is mechanically linked thereto, will also close at this time and this will cause a circuit to be completed from lead 214 to line L2 via leads 361, 362, now closed switch 254'leads 363, 364, normally closed switch 365, lead 366, pump motor 360, and overload relays 361. Motor 360 will operate only so long as switch 254' remains closed and this switch opens when switch 254 is released. A similar circuit is completed when the cover lower switch 286 is closed because switch armature 286' is mechanically linked thereto and will close simultaneously with switch 286 to complete the above-described circuit to motor 360 which drives pump 262. When switch 286 is released, switch 286' is also opened. Analogous circuits to motor 360 are completed because switch 320 which causes lift No. 1 to move up is mechanically coupled to switch 320' which closes at the same time as switch 320. An analogous circuit is completed to motor 360 because switch 329' is closed when its counterpart switch 329 is closed to cause lift loader No. 2 to move upwardly. Whenever loader No. 1 switch 329 is actuated to cause loader No. 1 to move down, switch 329', which is mechanically linked thereto, will close to energize hydraulic pump motor 360. Whenever switch 313 is energized to cause loader No. 2 to move downwardly, switch 313' will simultaneously be closed because it is mechanically linked to switch 313 to energize hydraulic pump motor 360. Whenever switch 291 is actuated to cause loader No. 2 to move upwardly, switch 329'' will close to energize pump 360. By the same token, whenever the unloader switch 351 is actuated, switch 351'which is mechanically coupled thereto, will be actuated to complete a circuit to motor 360. Also, unloader switch 335 is mechanically coupled to switch 335' which energizes motor 360 to supply hydraulic fluid whenever switch 335 is actuated.

In accordance with the present invention, all of the foregoing functions which were described manually can be performed in an automatic manner by the use of a programming arrangement. In other words, the particular functions to be performed can be programmed on a plate or the like and this can be fed to the machine so that there is uniformity of the products produced by the machine. This is necessary in certain operations where a predetermined formula has been established for the meat. For example, it may be necessary that the meat be loaded into the machine and given 20 bowl revolutions at a speed of 10 to 12 revolutions per minute. In addition, at this time the knives may be set to operate at high speed or possibly operate at high speed for the last half of the cycle and at low speed for the first half of the cycle. In addition, it can be programmed so for example one load of meat is dumped into the bowl at the beginning of the cycle and another load of different meat which does not require as much chopping is dumped into the bowl 14 at a later time in the cycle, after the first load has been cut to a predetermined size. All of the foregoing is by way of example and this method will be understood more fully hereafter.

In order to switch from manual operation, which was described in detail above, to automatic operation, master switch 172 is moved so that armature 370 thereof moves into engagement with contacts 371. This automatically removes armature 172 from contacts 173 so that manual operation can no longer be performed from the control panel 170. When armature 370 is moved onto contacts 371, line L1 is connected to lead 374 via lead 179, armature 370 and lead 375. This will cause the programmer 374' to be energized because current can pass through it from line 374 to line L2 via leads 376 and 377. As can be seen from FIG. 20, the programmer includes an electric motor 378 having a gear reducer 379 driven thereby which in turn mounts a gear 380 on its output shaft 381, gear 380 being in mesh with teeth 382 on a program plate or card 383 which is inserted into the programmer. The program plate 383, which is essentially a plastic plate, has a plurality of ridges 384, 385, 386, 387, 388 and 389 thereon, each having a cutaway portion designated by a primed numeral corresponding to the number of the ridge. The card is inserted into the suitable programmer and as soon as the card is placed in proper position, it will actuate a switch, not shown, which energizes the programmer and energizes motor 378 to drive the plate 383 through the programmer at a predetermined speed. This causes the card 383 to travel through the programmer in the direction of the ridges. Since motor 378 has a predetermined r.p.m., the length of any of the ridges of card 383 is a measure of time as are the cutout portions designated by the primed numerals. Each ridge 384—389 is associated with a separate switch in the circuit of the programmer. For example, switch 365 is controlled by ridge 384; switch 354 by ridge 385; switch 338 by ridge 386 and so forth. The switches shown in alignment with arrow 390 in FIG. 19 all assume their solid line positions when they are not actuated by card 383 and they will assume an opposite position when they are energized. By way of reference, they remain in their solid-line position when they ride on any of ridges 384—389 but will move to the opposite position when they fall into a cutaway portion 384'—389' of any of the ridges. Therefore, assume that a plate, such as 383, is placed into the programmer and it starts to run. If plate 383 calls for operating pump motor 360, switch 365 will be moved from its solid-line position to its dotted line position to complete a circuit to this motor 360 from line 374. Motor 360 is energized only when the unloader assembly 18 or the cover motor or the lift motors are energized. Therefore, it can be seen that switch 354 may be moved to its dotted line position to energize the unloader up solenoid 355 simultaneously with motor 360. Furthermore, the down unloader solenoid 340 may be energized by armature 338 moving to its dotted line position in response to the action of card 383. As can be seen from the remainder of the circuit which is established across lines 374 and L2, any combination of electric circuits can be established by the switches which are actuated by the ridges and grooves of card 383.

In addition, it is to be noted that a number of other functions are provided in lines 400, 401, 402 and 403 and these functions are activated whenever the armatures designated by like-primed numerals are activated by a card or plate such as 383. These functions may be the controlling of a solenoid valve to add water for a predetermined time to bowl 14 for mixture with the meat, said water emanating armatures a source under a controlled pressure so that the volume thereof can be accurately controlled. In addition, another of the switches for example 402' may control the door from a hopper to dump a predetermined amount of milk powder or other extenders into the meat product. In addition, certain of the switches, for example, 402' can be used to energize the bowl motor 45 to run faster and another can energize the motor to run slower. Furthermore, the knife speed can be controlled by the programming plate 383. In this respect, it is to be noted that armatures 186 and 198 are controlled by the card 383 to selectively cause the electric motor to drive the knife assembly 15 fast or slow, depending on which of these is closed. It can be seen that armatures 186 and 198 establish the circuits to the fast and slow windings of the motor through lead 405 running from terminal 371, the automatic terminal.

In addition, it is to be especially noted that the bowl speed is determined by the programmer. In this respect, two of the ridges on the program card 383 activate switches in the program circuit which drives the Bodine motor 239 (FIG. 18) for adjusting the size of orifice 241 associated with pump 222 (FIG. 18). One ridge is associated with a circuit including switch 410 which causes the Bodine motor to be speeded up and switch 411 causes it to run toward slow. Toward the end of each cycle performed by card 383 the motor circuit to motor 239 is completed through low switch 411 to cause motor 239 (FIG. 18) to drive gear reducer 240 in a direction to tend to close the orifice, to thereby index the orifice 241 at an opening corresponding to the lowest r.p.m. of the bowl which is 5 r.p.m. Thereafter, at the start of the next cycle a ridge and groove on card 383 will energize a switch, such as 410, which drives motor 239 to increase the orifice size until the desired rate of speed is achieved. It will be appreciated that plate 383 runs through the programmer at a predetermined speed. Therefore, the length of the ridges and grooves are a measure of time. Motor 239 which controls orifice 241 in pumps 222 also runs at a predetermined speed and therefore the amount which orifice 241 opens is a function of time measured from the lowest opening, 5 r.p.m., to which it was previously set. Thus after the orifice has been indexed at 5 r.p.m. at the end of a previous cycle, the length of time that switch 411 is closed at the beginning of the next cycle will determine the size of orifice 241 and the corresponding bowl speed. If desired, at a later time in the cycle, motor 239 can again be energized through switches 410 or 411 so as to cause a change in speed of the bowl. Positive stops, not shown, are associated with gear reducer 240 to cause it to stop when orifice 241 reaches a size corresponding to 5 or 20 r.p.m. In short, the card controller 383 can be utilized to provide any combination of functions such as low speed or high speed knife speeds, and bowl speeds anywhere between 5 and 20 r.p.m. It can cause either of the loaders to load. It can cause the unloader to move into the bowl or out of the bowl, at a predetermined time. In addition, the relays (not numbered) in any of the lines 401—403 can be used to energize suitable conveyors (not shown) simultaneously with the energization of unloader assembly 18, thereby carrying the meat to a subsequent work station.

The above-described type of automatic operation takes the guesswork out of cutting meat to a predetermined formula.

It is to be noted that there is a greater clearance between the tips of knives 79 and bowl 14 than between rim 62 and bearings 65. Thus the bearings will engage rim 62 and support bowl 14 in the event of tilting due to unbalance, before the knives 79 can be damaged by engaging the tilted bowl.

It can thus be seen that the improved meat cutting machine of the present invention is manifestly capable of achieving the above enumerated objects and while preferred embodiments have been disclosed, it will be appreciated that it is not limited thereto but may be otherwise embodied within the scope of the following claims:

I claim:

1. A meat cutting machine comprising a housing, an annular horizontal bowl mounted on said housing, knife means, means mounting said knife means on said housing with the knife means extending transversely into said bowl, electric motor means for driving said knife means, variable speed hydraulic means for driving said bowl, auxiliary hydraulic means in said machine, a knife cover on said housing, an unloader on said housing, said auxiliary hydraulic means comprising a first hydraulic motor for actuating said knife cover and a second hydraulic motor for actuating said unloader, said auxiliary hydraulic means including a pump means which is independent of said variable speed hydraulic means, and control means for selectively energizing said pump means only when said first and second motor means are to be actuated.

2. A meat cutting machine as set forth in claim 1 wherein said housing includes a bowl ring, an edge on said bowl ring, a first rim on said bowl, a labyrinth seal formed between said first rim and said bowl ring edge, a second rim on said bowl, bearing means on said bowl ring, a first clearance between said second rim and said bearing means, a second clearance between said first rim and said bowl ring edge forming said labyrinth seal, with said second clearance being greater than said first clearance whereby said bowl will be supported by said bearing means in the event of any unbalance before the sides of said labyrinth seal come into engagement.

3. A meat cutting machine comprising a housing, an annular horizontal bowl mounted on said housing, knife means, means mounting said knife means on said housing with the knife means extending transversely into said bowl, electric motor means for driving said knife means, variable speed hydraulic means for driving said bowl, auxiliary hydraulic means in said machine, a knife cover on said housing, an unloader on said housing, said auxiliary hydraulic means comprising a first hydraulic motor for actuating said knife cover and a second hydraulic motor for actuating said unloader, said housing including a bowl ring, a first rim on said bowl, an edge on said bowl ring forming a labyrinth seal with said first rim, bearing means mounted on said bowl ring, a second rim on said bowl, and a clearance between said bearing means and said second rim whereby said second rim does not engage said bearing means unless said bowl is cocked by an unbalanced load.

4. A meat cutting machine as set forth in claim 3 including a second clearance between said first rim and said edge forming said labyrinth seal and wherein said second clearance is greater than said first clearance whereby said bowl will be supported by said bearing means in the event of any unbalance before the sides of said labyrinth seal come into engagement.

5. A meat cutting machine as set forth in claim 4, including an auxiliary hydraulic pump for driving said first and second motors.

6. A meat cutting machine comprising a housing, a bowl mounted for rotation on said housing, an hydraulic motor for driving said bowl, a pump, hydraulic conduit means coupling said pump to said hydraulic motor, variable orifice means in said conduit means for selectively varying the flow between said pump and said hydraulic motor means to thereby vary the speed of said motor means, orifice actuating means for varying the size of said orifice means to thereby control the speed of said motor, first means for limiting the amount which said variable orifice means can open and second means for limiting the amount which said variable orifice means can close whereby the limits of speed for said bowl are established, programming means for establishing a predetermined bowl speed including means for causing said orifice actuating means to close said variable orifice means until said second means are effective to limit the size of said orifice means, and means for causing said orifice actuating means to move said orifice means toward a more open condition for a predetermined period of time at predetermined rate of speed to thereby cause said orifice means to assume a predetermined opening which controls the bowl speed.